Figure 1:
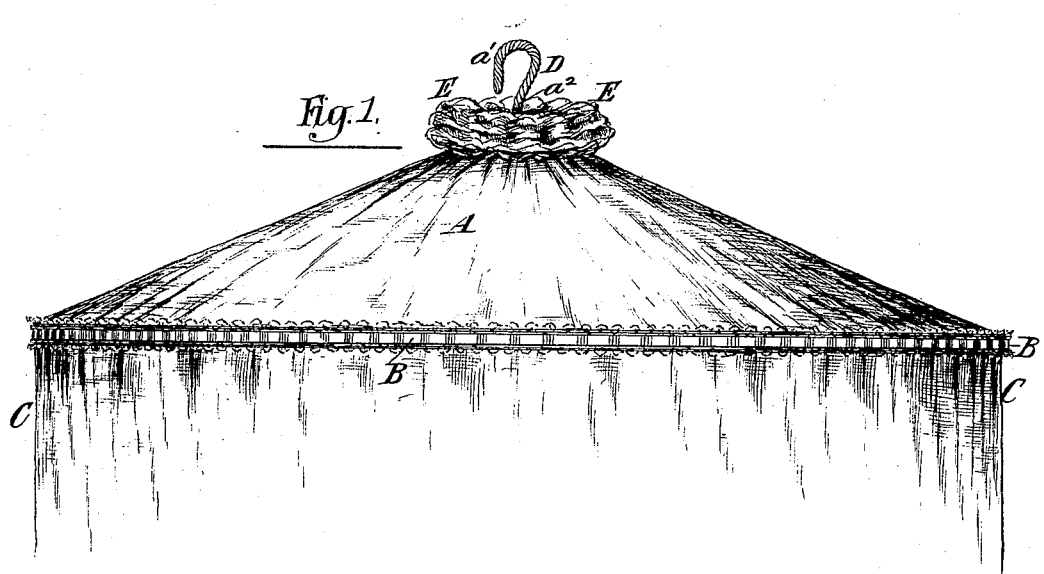

(No Model.)  2 Sheets—Sheet 1.

I. E. PALMER.
SUSPENSION DEVICE FOR MOSQUITO CANOPIES.

No. 322,066. Patented July 14, 1885.

Witnesses:—
C. L. Sundgren
Louis W. Whitehead

Inventor:—
Isaac E. Palmer
by his Attorneys
Brown & Hall (No Model.) 2 Sheets—Sheet 2.

I. E. PALMER.
SUSPENSION DEVICE FOR MOSQUITO CANOPIES.

No. 322,066. Patented July 14, 1885.

Witnesses:—
C. E. Sundgren
Louis M. F. Whitehead.

Inventor:—
Isaac E. Palmer
By his Attorneys
Brown & Hall

UNITED STATES PATENT OFFICE.

ISAAC E. PALMER, OF MIDDLETOWN, CONNECTICUT.

SUSPENSION DEVICE FOR MOSQUITO-CANOPIES.

SPECIFICATION forming part of Letters Patent No. 322,066, dated July 14, 1885.

Application filed February 19, 1884. (No model.)

*To all whom it may concern:*

Be it known that I, ISAAC E. PALMER, of Middletown, in the county of Middlesex and State of Connecticut, have invented a new and useful Improvement in Suspension Devices for Mosquito-Canopies, of which the following is a specification.

Heretofore mosquito-canopies which are suspended over beds have been provided with a hoop or frame from which the net is draped or hung, and a central suspension device or hook and surrounding metal rosette-like ornament. Such ornament and suspension hook or device have been expensive and heavy; and the object of my invention is to provide a more simple suspension device and ornament, which shall be less expensive and more in keeping with the light character of the canopy.

In carrying out my invention I employ a hook or device of metal, provided with flexible prongs which may be readily bent. This hook may be conveniently formed by taking two pieces of wire, doubling or folding each piece upon itself, then laying the two doubled pieces together and twisting them throughout a sufficient portion of their length to form, when bent, the beak and shank of a hook and leaving the end portions of the wires free, so that they may be bent outward and then upward. I then slip over the shank of the hook a washer, which may be of thick paper-board, wood, or other material, and which rests upon the outwardly-extending prongs, the latter projecting considerably above the washer. The central portion of the canopy has in it an opening or small hole, which is re-enforced by gathering the net about it or in any suitable way, and the hook is then inserted through said opening, and the net is slipped down on the shank of the hook and upon the washer, the net being impaled on the upwardly-projecting prongs. A fabric rosette, which may be cheaply made of net of different colors, is then slipped over the shank of the hook and pressed down upon the upwardly-projecting prongs, which latter are then bent over and downward, thus clamping the rosette, the canopy, and the washer securely together, while the hook projects sufficiently far above the rosette to enable it to be readily engaged with and disengaged from an eye or other device.

Although I consider the aforesaid washer very desirable, it may be dispensed with, and the canopy may be slipped over the shank and pressed down directly upon the upwardly-projecting ends of the wire prongs.

In lieu of the prongs of the suspension hook or device being bent outward and upward, they may be bent outward and downward, and in such case the prongs will be inserted downward through the canopy-top or through the canopy-top and rosette, and clinched on the under side of the canopy.

The invention consists in novel combinations of parts, hereinafter described, and pointed out in the claims.

Figures 2, 3:
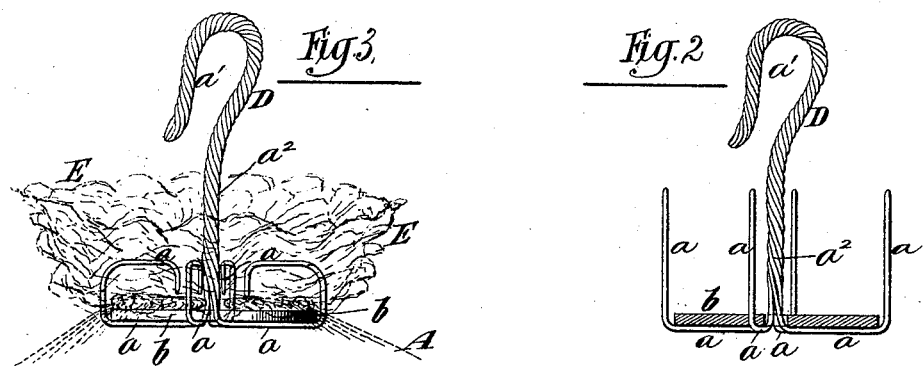
Figure 4:
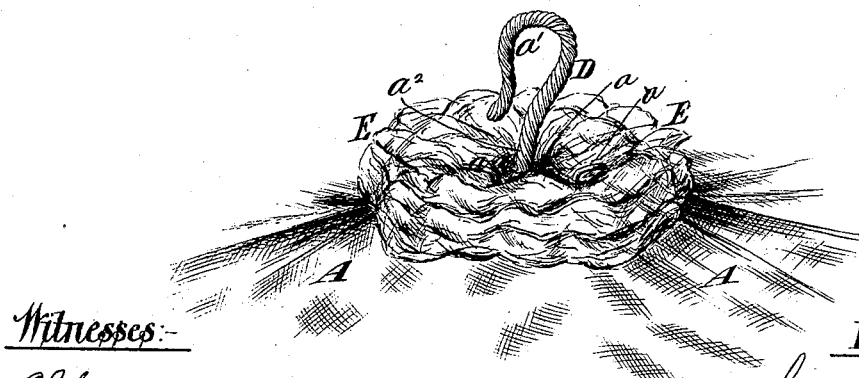
Figure 5:
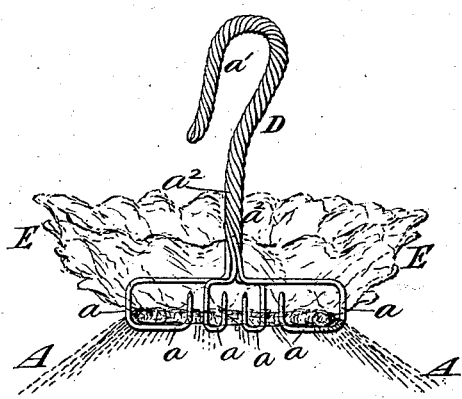

In the accompanying drawings, Figure 1 represents the upper portion of a canopy embodying my invention. Fig. 2 represents a view of the suspension-hook alone, with the washer resting upon its outwardly-extending prongs. Fig. 3 is a sectional view of the central portion of the canopy, showing the suspension-hook applied thereto. Fig. 4 is a perspective view of the parts shown in Fig. 3; and Fig. 5 is a view similar to Fig. 3, illustrating a modification of my invention.

Similar letters of reference designate corresponding parts in all the figures.

A designates the portion of net which forms the top of the canopy. B designates the hoop or frame on which it is extended; and C designates the net, which is draped or hung from said hoop or frame.

Referring now to Figs. 1 to 4, inclusive, D designates the suspension-hook, whereby the canopy may be suspended from an eye or other device; and E designates a rosette, which is made separate from the portion A of the canopy, and which may be made of net or other fabric, in two or more colors.

The manner of constructing and assembling the several parts is most clearly shown in Figs. 2 and 3.

The hook D is provided or formed with outwardly-extending prongs $a$, the ends of which are bent so as to project upwardly, and which are here shown as four in number. The hook and its prongs I prefer to form in the following simple and inexpensive manner: I take two pieces of wire of sufficient length, and double each piece on itself. The two doubled pieces I then place together, and twist them a sufficient distance from their upper ends to form, when bent, the beak and shank $a'$ $a^2$ of a hook. The four end portions of wire are then bent outward and upward to form the prongs $a$. I then slip over the beak and shank of the hook a washer, $b$, which may be of thick paper-board, wood, or any other suitable material. This washer rests on the outwardly-extending prongs $a$, while the upwardly-turned ends of the prongs project considerably above the washer.

At the center of the top A of the canopy is a hole or opening, around which the net is gathered or otherwise re-enforced in any suitable manner. The beak and shank of the hook D are then introduced through this hole or opening, and the piece A is pressed down upon the washer $b$ and impaled on the prongs $a$. The rosette E is then slipped down on the shank of the hook and impaled on the prongs $a$ in a similar manner, and said prongs are then turned inward and downward or clinched in the rosette, thus binding the rosette, the top A, and the washer $b$ all securely together.

The washer $b$ might be dispensed with, and in such case the top A will rest directly upon the outwardly-extending portions of the prongs $a$.

If desired, the hook D may be tinned or dipped in molten metal, thus giving it a neat finish, and securing the twisted portions together, so that they will form a strong hook. This suspension device may be very cheaply made and applied. It is so light that in case of the canopy falling no injury would be done the person beneath, and the suspension device and rosette are attractive in appearance and in keeping with the light and simple fabric with which they are used.

The hook D is adapted to be engaged with a suspension-eye; but, if desired, the suspension device might be formed of wire, as described, but with an eye at its upper end, in lieu of the hook, and in such case would be used with a hook fixed in the ceiling.

The suspension hook or device D shown in Fig. 5 is similar to that before described; but in this case the shank $a^2$ does not pass through a central opening in the canopy A and rosette E. In this example of the invention the prongs $a$ are bent outward and then downward. The rosette E and canopy-top A are then impaled on them, and the prongs are then clinched or bent inward on the under side of the canopy. A second rosette may be impaled on the prongs A before they are clinched, if desired.

I am aware that a suspension eye or device made of wire and secured to a cord or other article or fabric by flexible prongs is not new, and I do not claim such an eye or device, broadly, as of my invention.

I am also aware of Patent No. 238,313, granted March 1, 1881, to E. Solomons, and do not claim as my invention anything therein shown or described.

What I claim as my invention, and desire to secure by Letters Patent, is—

1. The combination, with a mosquito-canopy, and a frame for holding the same extended, and a fabric rosette, E, placed outside the top thereof, of a suspension hook or device, D, having at its inner end flexible prongs $a$, on which the canopy and rosette are impaled and secured by the clinched ends of the prongs, substantially as herein described.

2. The combination, with a mosquito canopy and frame, the canopy having a central opening, of a suspension hook or device having a shank, $a^2$, extending through said opening, and outwardly and upwardly extending prongs $a$ at its inner or lower end, which are inserted through the canopy and clinched above the canopy, substantially as herein described.

3. The combination, with a mosquito canopy and frame and a fabric rosette, the canopy and rosette having central openings, of a hook or suspension device having a shank, $a^2$, extending through the openings in the rosette and canopy, and having outwardly and upwardly extending prongs at the inner end inserted through the canopy and rosette and clinched above the rosette, substantially as herein described.

4. The combination, with a mosquito-canopy having a central opening and a frame, and a washer also having a similar opening, of a suspension hook or device having a shank, $a^2$, extending through the opening in said canopy and washer, and having at its inner end outwardly and upwardly extending prongs on which said washer rests, and which are inserted through the canopy outside the washer and clinched above the canopy, substantially as herein described.

5. The combination, with a mosquito canopy and frame, a fabric rosette, E, and a washer, $b$, all having central openings, of a suspension hook or device having a shank, $a^2$, extending through said openings, and at the inner end prongs $a$ on which the said washer rests, and which are inserted through the canopy and rosette outside the washer and clinched above the rosette, substantially as herein described.

6. The suspension-hook D for a mosquito-canopy, consisting of wires doubled, twisted together, and bent to form the beak $a'$ and shank $a^2$ of the hook, and the end portions of which form outwardly-extending prongs $a$, substantially as herein described.

I. E. PALMER.

Witnesses:
HARRY BOGERT,
C. HALL.